UNITED STATES PATENT OFFICE.

OLIVER KAMM, OF URBANA, AND ERNEST H. VOLWILER, OF CHICAGO, ILLINOIS.

ANESTHETIC COMPOUND.

1,388,573.  Specification of Letters Patent.  Patented Aug. 23, 1921.

No Drawing.   Application filed June 14, 1920. Serial No. 388,803.

*To all whom it may concern:*

Be it known that we, OLIVER KAMM and ERNEST H. VOLWILER, residing, respectively, at Urbana, in the county of Champaign and State of Illinois, and at Chicago, in the county of Cook and State of Illinois, have invented certain new and useful Improvements in Anesthetic Compounds, of which the following is a specification.

Our invention relates to the production of di-allyl amino alcohol esters of aromatic acids, and relates particularly to the production of di-allyl amino alcohol esters of an aromatic acid containing a benzene nucleus.

The object of the invention is to provide a compound having valuable anesthetic properties.

A further object of the invention is to provide a local anesthetic which will be of particular value in treating the mucous membrane.

*General method of synthesizing compounds of this series.*

Benzoyl chlorid or a substituted benzoyl chlorid is dissolved in benzene and treated with a di-allyl amino alcohol and the mixture refluxed during one hour; the reaction mixture is then treated with dilute acid in order to dissolve all the basic compounds and the aqueous layer make alkaline with sodium hydroxid. This precipitates the di-allyl amino alcohol ester of the benzoic acid used, which can be extracted and dissolved in hydrochloric acid in order to produce the salt.

*A specific compound.*

A specific compound belonging to the general series as above defined is the γ-di-allyl amino propyl alcohol ester of para-amino benzoic acid. This compound may be prepared by the general process described above. In benzene as a solvent, one molecule of p-nitro benzoyl chlorid is added to one molecule of γ-diallyl amino propyl alcohol. (Diallyl amino propyl alcohol, which has not yet been described in the literature, is readily formed by the condensation of trimethylene chlorhydrin and di-allyl amin and boils at 215°–217° C. at 755 mm.) and the mixture refluxed an hour in a water bath. The reaction mixture is then shaken with dilute hydrochloric acid and the aqueous layer treated with tin and, if necessary, more hydrochloric acid. The temperature should be kept at about 50° C., so that the minimum amount of hydrolysis will take place. When no more heat is evolved, due to the reaction, heat is applied to maintain the temperature at 50° C. for about one-half hour longer. The solution is poured from the excess tin, diluted with water, and freed from tin by means of hydrogen sulfid. Upon filtering off the tin sulfid, and making alkaline, the γ-di-allyl amino propyl ester of p-amino benzoic acid separates out. This is extracted and then treated with one molecule of hydrochloric acid. In this way, the monohydrochlorid is produced, which crystallizes from water in white crystals, melting at 138° C. By using other acids for dissolving the base, other salts are produced.

The above compound is of great efficacy as an anesthetic for the mucous membrane, and has properties resembling those of cocain.

Another specific member belonging to this series is the β-diallyl aminoethyl alcohol ester of p-amino-benzoic acid. It may be prepared by a method exactly analogous to that already described. Molecular quantities of p-nitrobenzoyl chlorid and β-diallyl amino ethyl alcohol are combined in benzene solution to form the hydrochlorid of the β-diallyl aminoethyl ester of p-nitrobenzoic acid. The latter compound is reduced with tin and hydrochloric acid in the manner already described. The hydrochlorid of the resulting β-diallyl aminoethyl ester of p-amino-benzoic acid is a white crystalline solid melting at 158°–160° C.

The di-allyl amino alcohol esters of the aromatic acids containing a benzene nucleus above specified, are either liquid compounds or low-melting solids. They are insoluble in water, but readily soluble in ether. All of these bases, as well as their various salts, possess anesthetic properties. When heated with an aqueous solution of alkali, they undergo decomposition, yielding diallyl amino alcohols and salts of aryl acids.

The scope of the invention is determined by the terms of the appended claims, which should be interpreted as broadly as possible consistent with the state of the art.

We claim as our invention:

1. As a new article of manufacture, diallyl amino alcohol ester of an aromatic acid containing a benzene nucleus.

2. As a new anesthetic compound, the γ-diallyl amino propyl ester of p-amino benzoic acid which is a low-melting solid forming a monohydrochlorid melting at 138° C.

OLIVER KAMM.
ERNEST H. VOLWILER.